United States Patent
Pease et al.

(10) Patent No.: US 6,558,513 B1
(45) Date of Patent: May 6, 2003

(54) NON-AQUEOUS RELEASE FROM PAPER MACHINE EQUIPMENT

(75) Inventors: Jacqueline K. Pease, St. Augustine, FL (US); William A. Hendriks, Jacksonville, FL (US)

(73) Assignee: Hercules Incorporated, Wilmington, DE (US)

( * ) Notice: Subject to any disclaimer, the term of this patent is extended or adjusted under 35 U.S.C. 154(b) by 0 days.

(21) Appl. No.: 09/866,830

(22) Filed: May 29, 2001

(51) Int. Cl.$^7$ .............................. D21H 17/04; D21C 9/08
(52) U.S. Cl. ............................ 162/173; 162/199; 106/2
(58) Field of Search ..................... 162/173, 199, 162/358.1; 106/2; 427/180, 384

(56) References Cited

U.S. PATENT DOCUMENTS

| | | | |
|---|---|---|---|
| 4,028,172 A | 6/1977 | Mazzarella | 162/164 R |
| 4,439,344 A | * 3/1984 | Albanese | 252/312 |
| 4,704,776 A | 11/1987 | Watanabe et al. | 29/132 |
| 4,940,846 A | 7/1990 | Hinterwaldner | 427/385.5 |
| 5,061,524 A | 10/1991 | Hinterwaldner | 427/385.5 |
| 5,210,121 A | 5/1993 | Hinterwalder | 524/109 |
| 5,658,374 A | * 8/1997 | Glover | 106/2 |
| 5,863,385 A | 1/1999 | Siebott et al. | 162/199 |
| 6,139,911 A | 10/2000 | Vanhecke et al. | 427/180 |

FOREIGN PATENT DOCUMENTS

NL 8105792 * 7/1983

OTHER PUBLICATIONS

Chem Abst 126: 158948v (1997) of JP 08,337,988 to Ichihara et al.
Chem Abst. 131:352740q; (1999) of JP 11 323,766 to Murano et al.
OSI Specialities Brochure "Silicone Fluids, Emulsions and Foam Control Agents for Your Application", pp. 15, 16, 22, 23 and 28.
Amoco Chemical Company/Bulletin 12–0N, "Amoco Polybutene", 1994.

* cited by examiner

Primary Examiner—Dean T. Nguyen
(74) Attorney, Agent, or Firm—Gary A. Samuels

(57) ABSTRACT

Disclosed is a method of improving the release of paper webs from the surface of press rolls or other paper making or converting equipment by applying to such a surface non-aqueous, non-curing hydrocarbon polymer compositions. The non-curing hydrocarbon polymers have the formula $(CH_3)_3C-[-C(R_1)(R_2)-C(R_3)(R_4)-]_n-C(R_5)=C(CH_3)_2$ (I) wherein $R_1$ through $R_5$ are hydrogen or $-CH_3$, with at least one of $R_1$ through $R_4$ being $-CH_3$, and n is such that the number average molecular weight of such hydrocarbon polymers is from 50 to 3000. They may be hydrogenated. Preferred non-curing hydrocarbon polymers are polybutenes of the formula $(CH_3)_3C-[-CH_2-C(CH_3)_2-]_n-CH=C(CH_3)_2$ (II). Preferred compositions comprise at least one such hydrocarbon polymer component having a number average molecular weight from 400 to 700 and a second such component having a number average molecular weight of 100 to 400. The compositions are applied to the equipment surface in the absence of water.

35 Claims, No Drawings

NON-AQUEOUS RELEASE FROM PAPER MACHINE EQUIPMENT

BACKGROUND OF THE INVENTION

(1) Field of the Invention

The present invention relates to improving release of a paper web from the surface of equipment used in paper making processes. The invention also relates to decreasing the force necessary to remove the paper web from such equipment surfaces and to decreasing deposition of undesirable contaminants on such surfaces. The method of the invention comprises continuously or intermittently applying to such a surface non-aqueous, non-curing hydrocarbon polymer compositions. Preferred non-curing hydrocarbon polymers are polybutenes. The principal use of the present invention is on the surface of rolls used in the press section of the paper making process where application of the non-aqueous, non-curing hydrocarbon polymer compositions also has the advantage of eliminating the need for the large amounts of water typically used. Additionally, the invention could be used on other equipment surfaces of papermaking or paper converting processes where web release or deposition prevention is important. Examples of such equipment surfaces include lump-breaker rolls, couch rolls, uhle box covers, dryer cans, calender rolls, corrugating fluting rolls, papermaking fabrics including those used in through air dryers, fabric carrier rolls, and printing presses.

(2) Discussion of the Background

In the papermaking process, paper is formed into a continuous wet web which is then drained of water in the press section and dried in the dryer section. The web leaves the forming section and enters the press section containing, by weight, roughly 80% water. It exits the press section and enters the dryer section at approximately 60%, by weight, water.

The press section consists of one or more press nips formed between two rotating press rolls that squeeze the sheet as it passes through. Often one of the press rolls forming the nip will be felted and the other will be a relatively hard surface made of ceramic, granite, or a synthetic composite. As the web exits the nip it has a tendency to adhere to the hard, relatively smooth surface of the non-felted press roll. This adhesion requires the paper maker to apply force to the web by running subsequent operations at a higher speed in order to separate the web from the roll surface. Because the wet paper web is of limited strength, the adhesion to the roll can force the web to stretch to the point of causing breaks that disrupt the paper making operation.

The web adhesion to the roll can also cause unwanted materials such as fiber, inorganic fillers, or sticky contaminants to remain as a deposit on the roll surface. This deposit is often referred to as press picking or dusting. Doctor blades are commonly used to mechanically remove the material that has deposited on the roll surface. Doctor blades also protect the press section (felt and rolls) from damage resulting from large wads of paper from web breaks or other matter entering the nip area. It is common practice to directly spray water onto the press rolls prior to the doctor blade to provide lubrication to the roll so that the doctor blades do not cause premature wear of the roll cover. The disadvantage of such water shower is that they bring additional moisture to the web of paper at the press nip, when the goal is to remove water from the web. Additionally, they generate large amounts of waste water requiring treatment.

Roll manufacturers have attempted to improve web release from rolls by imparting some combination of permanent hydrophilic and hydrophobic properties to the roll surface. Such permanent hydrophilic and hydrophobic properties are used to increase release by interrupting the water film at the interface between the roll and the sheet. There are many examples in the patent literature where hydrophobic release agents are permanently added to press rolls. For example, Snellman (CA 2093829) teaches that a ceramic press roll cover can be partially coated with a cured fluoropolymer such as Teflon® to impart release characteristics.

Even with these roll cover modifications, chemical additives are often needed to control deposition or improve release. These chemicals are usually added to the water showers. For example, Murano (JP 11323766) teaches the use of water-soluble cationic polymers added to the shower water before the doctor blade to inhibit press roll dusting or picking. Ichihara (JP 08337988) also teaches the use of a cationic polymer in combination with a cationic surfactant to inhibit pitch deposition by spraying onto paper machine parts.

Some silicone-based materials are also known for preventing press roll adhesion. In one example, U.S. Pat. No. 4,704,776 to Watanabe teaches that the pores of a ceramic press roll cover can be impregnated with a silicone oil, a silicone plastic, or a fluoroplastic to impart release. In another example, U.S. Pat. No. 4,028,172 to Mazzarella teaches a method of controlling picking on wet press rolls through addition of polysiloxane polymers to the paper feed stock before sheet formation or by spraying on the wet web prior to pressing. Two specific types of polysiloxane polymers are taught: a water soluble polydimethylsiloxane polyoxyalkylene ether (a silicone surfactant) copolymer or an aqueous emulsion of polydimethyl siloxane (silicone oil). Silicone specialties manufacturer OSi (brochure 50-001-00, 1995) recommends certain of its silicone oils for anti-blocking applications in paper manufacture and certain of its silicone surfactants and silicone oil emulsions for preventing paper from sticking to rollers and dryers during paper manufacture. However, silicones have the disadvantage of being relatively expensive and have not eliminated the need for water showers on press rolls and the like.

Certain hydrophobic chemicals, typically in the form of aqueous emulsions, are also applied to paper machine equipment such as press rolls to control adhesion. For example, U.S. Pat. No. 5,658,374 to Glover teaches that an oil-in-water emulsion containing an alcohol, a fatty acid or an oil, and lecithin emulsified with a water-soluble or water-dispersible surfactant can be used to control sticky deposition on the surfaces of press rolls, yankee rolls and couch rolls surfaces in papermaking. In another example, U.S. Pat. No. 5,863,385 to Siebott et. al. teaches a process for cleaning and preventing deposition on paper machine parts, including the press section, by treating the surface with an oil-in-water emulsion. The oil phase can be any of several compounds including saturated hydrocarbons, fatty alcohols, fatty acids, fatty acid esters, paraffin oil, mineral oil or poly-alpha-olefins. The concentration of the oil-in-water emulsion in aqueous dilution is preferably 1–25%-weight relative to the aqueous dilution. It is applied at a rate of 20–500 L per hour per meter of the machine's working width. In another example, U.S. Pat. No. 6,139,911 to Vanhecke et. al. teaches the use of aqueous microemulsions for improving the release properties of press rolls where the oil phase is selected from oils, water insoluble surfactants, water insoluble polymers, and waxes. The microemulsion is applied by first diluting it with excess water or by applying it directly in the presence of excess water. When the microemulsion is applied to the press roll in either diluted manner, the emulsion breaks up, causing the release components to deposit on the roll surface as larger macroemulsion size (or greater) particles, which are more efficient at affecting release.

However, such hydrophobic release agents have the disadvantage that they contain surfactants necessary for their preparation. These same surfactants are well known to increase wetting and therefore will tend to increase the hydrophilic nature of the roll surface. Because the web of paper in the press section contains 60–80% water, increasing the hydrophilic nature of the press roll surface will promote adhesional wetting of the paper web to the roll. Thus, when the web is separated from the roll, the separation point will more likely occur within the water layer from the web that is contacting the roll surface potentially leading to increased fibers and other web components depositing on the roll surface.

U.S. Pat. Nos. 4,940,846, 5,061,524 and 5,210,121 to Hinterwaldner teach that curable polymeric compositions containing certain petrochemical fractions rich in methyl side groups can be used to impart hydrophobic character to substrates to promote release when these compositions are cured on the substrate. As noted, the compositions of Hinterwaldner must be cured. Curing refers to causing, through application of heat and/or chemicals, a permanent physiochemical change; in this case to produce a cross-linked, hardened film on the substrate. Unlike the non-curable hydrocarbon polymers used in the present invention, the Hinterwaldner compounds including a —[—C($R_1$)($R_2$)—C($R_3$)($R_4$)—]$_n$— repeating unit must be linked to a group having a sufficient number of reactive double bonds, epoxides or other reactive groups necessary to make such compositions curable.

SUMMARY OF THE INVENTION

The present invention provides a method for improving paper web release and for reducing deposition from press rolls or other paper processing equipment by increasing the hydrophobicity of the equipment surfaces to make the surfaces more water repellent. The method comprises applying to the equipment surface a non-aqueous, non-curing hydrocarbon polymer composition. The non-curing hydrocarbon polymers used in the practice of the invention have the formula

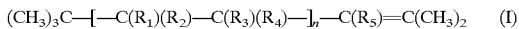
$$(CH_3)_3C\text{—}[\text{—}C(R_1)(R_2)\text{—}C(R_3)(R_4)\text{—}]_n\text{—}C(R_5)\text{=}C(CH_3)_2 \quad (I)$$

or hydrogenates thereof, wherein $R_1$ through $R_5$ are hydrogen or —$CH_3$, with at least one of $R_1$ through $R_4$ being —$CH_3$, and n is such that the number average molecular weight of such hydrocarbon polymers is from 50 to 3000. Preferred non-curing hydrocarbon polymers are polybutenes having the formulas

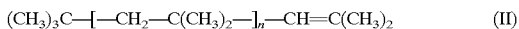
$$(CH_3)_3C\text{—}[\text{—}CH_2\text{—}C(CH_3)_2\text{—}]_n\text{—}CH\text{=}C(CH_3)_2 \quad (II)$$

or

$$(CH_3)_3C\text{—}[\text{—}CH(CH_3)\text{—}CH(CH_3)\text{—}]_n\text{—}CH\text{=}C(CH_3)_2 \quad (III)$$

or hydrogenates thereof.

The non-aqueous compositions can be applied by any means, such as, with mists, sprays, rollers, puddles or any other means known in the art of applying a thin layer of product to the surface on a continuous or intermittent basis. A preferred method of applying the product would be by atomizing it to a mist with air. The atomized mist would be applied to the equipment surface through a nozzle that traverses back and forth across the width of the machine or through a series of stationary nozzles placed across the width of the machine. Preferably, the amount applied and manner of application are sufficient to maintain a uniform coating of the non-aqueous, non-curing hydrocarbon polymer composition on the equipment surface during operation.

Non-curing polybutene compositions have been found to increase the hydrophobic nature of press roll surfaces. Surprisingly, polybutene compositions have also been found to be more effective then water-based products at reducing wet web adhesion to press roll surfaces.

The method of this invention also offers additional advantages. Polybutenes are less costly than other known hydrophobic release agents such as fluoropolymers and silicone oils. The compositions of this invention are intended to replace the water shower on press rolls before the doctor blade reducing the amount of water carried to the web from the roll, potentially increasing web dryness exiting the press section. Polybutenes are known to be effective lubricants, therefore the compositions described in this invention are expected to provide an additional lubrication benefit to reduce press cover wear from the doctor blades.

The invention could be used on other equipment surfaces of papermaking or paper converting processes where making the surfaces more hydrophobic to enhance release or to prevent deposition is of importance. Examples of such equipment surfaces include lump-breaker rolls, couch rolls, uhle box covers, dryer cans, calender rolls, corrugating fluting rolls, papermaking fabrics including those used in through air dryers, fabric carrier rolls, and printing presses.

DETAILED DESCRIPTION OF THE INVENTION

In one aspect, the invention provides a method of reducing adhesion to a surface of equipment used in paper manufacture or in paper converting processes, said method characterized in applying to such surface a non-aqueous composition comprising one or more non-curing hydrocarbon polymers having the formula

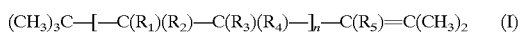
$$(CH_3)_3C\text{—}[\text{—}C(R_1)(R_2)\text{—}C(R_3)(R_4)\text{—}]_n\text{—}C(R_5)\text{=}C(CH_3)_2 \quad (I)$$

or hydrogenates thereof, wherein $R_1$ through $R_5$ are hydrogen or —$CH_3$, with at least one of $R_1$ through $R_4$ being —$CH_3$, and n is such that the number average molecular weight of such hydrocarbon polymers is from 50 to 3000. Preferably, the number average molecular weight of such hydrocarbon polymers is from 100 to 1000. Preferably, the one or more non-curing hydrocarbon polymers have the formulas

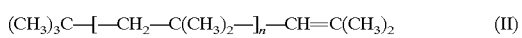
$$(CH_3)_3C\text{—}[\text{—}CH_2\text{—}C(CH_3)_2\text{—}]_n\text{—}CH\text{=}C(CH_3)_2 \quad (II)$$

or

$$(CH_3)_3C\text{—}[\text{—}CH(CH_3)\text{—}CH(CH_3)\text{—}]_n\text{—}CH\text{=}C(CH_3)_2 \quad (III)$$

or hydrogenates thereof.

Preferred non-aqueous compositions for use in the method are those wherein the non-curing hydrocarbon polymers comprise at least one component having a number average molecular weight from 400 to 700 and, more preferably, at least one second such component having a number average molecular weight from 100 to 400.

Further preferred non-aqueous compositions for use in the method are those wherein the non-aqueous composition comprises one or more non-curing hydrocarbon polymers and one or more non-aqueous solvents. Preferred non-aqueous solvents are selected from mineral oil, white oil and petroleum distillate.

Further preferred non-aqueous compositions for use in the method are those wherein the non-aqueous composition comprises one or more non-curing hydrocarbon polymers and one or more hydrophobic additives. Preferred hydrophobic additives are selected from paraffin wax, microcrystalline wax, petrolatum gel and fatty amide wax.

In another aspect, the invention provides a method of reducing adhesion to a surface of equipment used in paper manufacture or in paper converting processes, said method characterized in applying to the equipment surface a non-aqueous composition comprising one or more non-curing polybutenes having the formulas

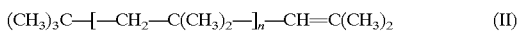

(II)

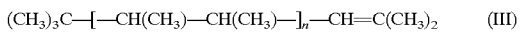

(III)

or hydrogenates thereof, wherein n is such that the number average molecular weight of such non-curing polybutenes is from 50 to 3000. Preferably, the number average molecular weight of such hydrocarbon polymers is from 100 to 1000. Preferably, the non-curing polybutenes have at least one component having a number average molecular weight from 400 to 700.

Preferably, the non-curing polybutenes have the formula

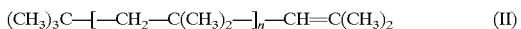

(II)

or hydrogenates thereof.

A preferred non-aqueous composition for use in the method of this aspect of the invention comprises (a) from 20 to 100 percent by weight of hydrogenated or non-hydrogenated, non-curing polybutenes of the formula

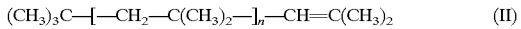

(II)

with a number average molecular weight from 400 to 700; and (b) from 0 to 80 percent by weight of one or more components selected from
  (i) a non-curing polybutene of the formula (II) with a number average molecular weight from 100 to 400,
  (ii) one or more non-aqueous solvents; and
  (iii) one or more hydrophobic additives.

Preferably, one or more (b) components are present in the composition and, more preferably, comprise at least one such non-curing polybutene having a number average molecular weight from 100 to 400. Preferably, the non-curing polybutene with a number average molecular weight from 400 to 700 comprises 50 to 90 percent by weight of the composition. More preferably, non-curing polybutene with a number average molecular weight from 100 to 400 comprises 10 to 50 percent by weight of the composition. The preferred non-aqueous solvents are selected from mineral oil, white oil and petroleum distillate. The preferred hydrophobic additives are selected from paraffin wax, microcrystalline wax, petrolatum gel and fatty amide wax.

In a preferred aspect, the invention provides a method of reducing adhesion to a surface of equipment used in paper manufacture or in paper converting processes, said method characterized in applying a non-curing polybutene composition to such surface, wherein the non-curing polybutene composition comprises (a) from 20 to 100 percent by weight of hydrogenated or non-hydrogenated, non-curing polybutenes of the formula

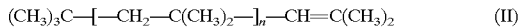

(II)

with a number average molecular weight from 400 to 700; and (b) from 0 to 80 percent by weight of one or more components selected from
  (i) non-curing polybutenes of the formula (II) with a number average molecular weight from 100 to 400,
  (ii) one or more non-aqueous solvents; and
  (iii) one or more hydrophobic additives.

Preferably, one or more (b) components are present in the composition and, more preferably, comprise at least one such non-curing polybutene having a number average molecular weight from 100 to 400.

Preferably, the non-curing polybutenes with a number average molecular weight from 400 to 700 comprises 50 to 90 percent by weight of the composition. More preferably, non-curing polybutenes with a number average molecular weight from 100 to 400 comprise 10 to 50 percent by weight of the composition. The non-aqueous solvents, when present preferably comprises 10 to 50% by weight of the composition. The preferred non-aqueous solvents are selected from mineral oil, white oil and petroleum distillate. The hydrophobic additives, when present, preferably comprise 1 to 25 percent by weight of the composition. The preferred hydrophobic additives are selected from paraffin wax, microcrystalline wax, petrolatum gel and fatty amide wax. When the hydrophobic additives are selected from paraffin wax, microcrystalline wax, and fatty amide wax, they preferably comprise 1 to 10 percent by weight of the composition.

Polybutene is commercially available from BP Amoco under the trade name Indopol. BP Amoco Bulletin PB12-N D0394 (1994) describes polybutenes as viscous, non-drying liquid polymers that are chemically stable and permanently liquid. Polybutenes, the major component of which is represented by structural formula (II) below, result from the polymerization of isobutylene. The compounds represented by structural formula (III) below result from the polymerization of 2-butene and are also referred to herein as polybutenes. In the case of hydrogenated polybutene, the double bond becomes saturated.

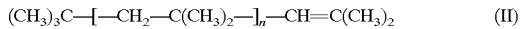

(II)

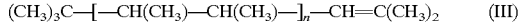

(III)

Either polybutene or hydrogenated polybutene are effective in the invention. The composition can contain a blend of one or more polybutenes, differing in molecular weight. Polybutenes with number average molecular weights from 50 to 3000 are expected to be effective. Non-curing compositions containing polybutene with number average molecular weight from 100 to 1000 are preferred. It is most preferred that the non-curing polybutene composition contain at least one component selected from polybutene with number average molecular weight from 400 to 700 and at least one component selected from polybutene with average molecular weight from 100 to 400.

The non-curing polybutene compositions can contain other components to enhance various properties. Polybutenes are viscous and may require dilution with a solvent to reduce viscosity for some application methods. Preferred solvents would not reduce the hydrophobicizing effect of the polybutene, examples would include hydrocarbon solvents such as mineral oil, white oil, or petroleum distillates.

Further, hydrophobic additives that commonly exist as solids or gels at room temperature can also be added to the polybutene composition to improve various performance properties such as lubrication or staying power on the equipment surface. Examples of such hydrophobic materials include paraffin wax, microcrystalline wax, petrolatum gel, and fatty amide wax. Preferably 30 to 100% by weight of the composition is polybutene, 0 to 70% is hydrocarbon solvent, and 0 to 25% is hydrophobic additives. Where the hydrophobic additives are selected from paraffin wax, microcrystalline wax, and fatty amide wax, they are preferably present in the 1 to 10 percent by weight of the composition. Other additives such as polymeric dispersants or preservatives could also be included in small quantity to increase formulation stability.

The invention will be further illustrated by the following examples, which are included as illustrations of the invention and should not be construed as limiting the scope thereof.

EXAMPLES

Viscosities of Sample Compositions

Presented below are viscosities of several compositions of the invention used in the Examples below.

| Viscosity in Centapoise (cp) | | |
| --- | --- | --- |
| | 25 c | 5 c |
| PB-1 | 49 cp | 156 cp |
| PB-3 | 500 | 2409 |
| PB-6 | 173 | 872 |
| PB-7 | 87 | 346 |
| PB-13 | 207 | 1520 |

The room temperature viscosity (25c) is the most important as it relates to the usual application temperature for press rolls and the like. For a spray mist type application a viscosity of around 1000 cp or less is preferable; most preferable would be about 200 cp or less. Other application methods may not require such a low viscosity. For example, the product could be applied by pumping it into a puddle on the roll, and having the doctor blade wipe off the excess. It is desirable to have a viscosity of about 3000 or less for pumping, most preferably less then about 1000.

EXAMPLES

The chemical compositions evaluated in the examples are described in Table 1.

TABLE 1

| Chemical Compositions used in Examples | |
| --- | --- |
| REFERENCE | DESCRIPTION |
| PB-1 | Polybutene 370 MW |
| PB-2 | Polybutene 455 MW |
| PB-3 | Polybutene 510 MW |
| PB-4 | Polybutene 675 MW |
| PB-5 | Hydrogenated Polybutene 370 MW |
| PB-6 | 70% PB-3, 30% PB-1 |
| PB-7 | 30% PB-3, 70% PB-1 |
| PB-8 | 57% PB-3, 41% PB-1, 2% Paraffin Wax |
| PB-9 | 26% PB-3, 70% PB-1, 4% Microcrystalline Wax |
| PB-10 | 28% PB-3, 70% PB-1, 2% Sterile Erucamide Wax |
| PB-11 | 50% PB-3, 50% refined Mineral Oil |

TABLE 1-continued

| Chemical Compositions used in Examples | |
| --- | --- |
| REFERENCE | DESCRIPTION |
| PB-12 | 33% PB-3, 60% refined Mineral Oil, 7% Microcrystalline Wax |
| PB-13 | 50% PB-3, 25% PB-1, 10% Paraffinic Oil, 15% Petrolatum Gel |
| L-1 | Aqueous cationic polymer and cationic surfactant blend |
| L-2 | Polydimethyl siloxane polyoxyethylene/propylene surfactant |
| L-3 | Polydimethyl siloxane 50 cst |
| L-4 | Polydimethyl siloxane 1000 cst |
| L-5 | Aqueous Emulsion of Polydimethyl siloxane 1000 cst |
| L-6 | Concentrated nonionic microemulsion of a water insoluble surfactant |
| L-7 | Microemulsion of water insoluble surfactants plus cationic polymer |
| L-8 | Water based mineral oil and ethylene bis stearamide wax emulsion |
| L-9 | Mineral oil |
| L-10 | Ethylene bis stearamide wax |
| L-11 | Tall oil fatty acid |
| L-12 | Methyl oleate fatty ester |
| L-13 | Water insoluble surfactant, alcohol ethoxylate (3 moles EO) |

Example 1

Contact angles were used to assess the ability of a chemical to make a model surface more hydrophobic in order to promote release. Contact angle is a measure of wetting behavior. Water does not wet hydrophobic surfaces well and therefore produces a high contact angle on such surfaces. In contrast, a low water contact angle is an indication of a hydrophilic surface. Two methods were used to measure contact angle. For Method A, the contact angle for several drops of deionized water was measured visually using a Goniometer. For Method B a Fibro Dat dynamic contact angle tester was used to measure angles continuously over time; the average of the contact angles of several drops of water was recorded for 0.1, 1 and 10 seconds. A model surface similar in surface energy and wetting characteristics to common press roll cover material was used.

Chemical treatments were applied to the model surface. For water-based compositions the treatment was allowed to dry so that only a thin layer of the chemical remained on the surface. Oil-based compositions were wiped off the surface after a short exposure time so that only a thin film remained. Average contact angles of deionized water drops on the surface coated with the chemical compositions from Table 1 are presented in Table 2. The blank refers to the contact angle on the uncoated model surface.

TABLE 2

| Average Contact Angle of Deionized Water on Coated Model Surface | | | | |
| --- | --- | --- | --- | --- |
| | | METHOD B | | |
| REFERENCE | METHOD A | 0.1 sec | 1.0 sec | 10 sec |
| Blank | 68 | 66 | 65 | 63 |
| PB-1 | 73 | 80 | 73 | 71 |
| PB-2 | 77 | 86 | 79 | 71 |
| PB-3 | 84 | 87 | 81 | 72 |
| PB-4 | 82 | 86 | 81 | 69 |
| PB-5 | 72 | 80 | 72 | 68 |
| PB-6 | | 92 | 79 | 74 |
| PB-7 | 75 | 85 | 76 | 74 |

TABLE 2-continued

Average Contact Angle of Deionized Water on Coated Model Surface

| | | METHOD B | | |
|---|---|---|---|---|
| REFERENCE | METHOD A | 0.1 sec | 1.0 sec | 10 sec |
| PB-8 | | 82 | 75 | 71 |
| PB-9 | | 83 | 75 | 73 |
| PB-10 | | 84 | 76 | 74 |
| PB-11 | 74 | 79 | 71 | 70 |
| PB-12 | | 88 | 77 | 74 |
| PB-13 | | 87 | 78 | 73 |
| L-1 | 0 | | | |
| L-2 | 12 | | | |
| L-3 | 72 | 78 | 74 | 72 |
| L-4 | | 90 | 76 | 73 |
| L-5 | 0 | | | |
| L-6 | 11 | | | |
| L-7 | 16 | | | |
| L-8 | 40 | | | |
| L-9 | 74 | 71 | 68 | 66 |
| L-10 | 108 | 124 | 120 | 111 |
| L-11 | 56 | 52 | 52 | 52 |
| L-12 | 67 | 56 | 56 | 55 |
| L-13 | 7 | | | |

All polybutene blends (PB-1 through PB-13) increased the hydrophobicity of the model surface, reducing wetting.

Examples suggested in the patent literature made the model surface more hydrophilic, increasing wetting. The cationic polymer and cationic surfactant blend (L-1), silicone surfactant (L-2), and microemulsions of water insoluble surfactants (L-6 and L-7) all significantly increased wetting. Even emulsions (L-8 and L-5) containing highly hydrophobic components such as fatty amide wax (L-10) or silicone oil (L-4) increased the hydrophilic nature of the model surface due to the surfactants used for emulsification. Other materials suggested in the patent literature to be hydrophobic release components, fatty acids, fatty esters, and water insoluble surfactants (L-11 through L-13) actually increased the wetting of the model surface.

Example 2

Paper webs can contain surfactants that are known to increase the wetting ability of water. To ensure that chemical compositions were still able to increase the hydrophobicity of the roll surface in the presence of such surfactants, synthetic sheet water was developed similar in composition, surface tension, and wetting characteristics, to sheet waters from paper mills producing newsprint. Average contact angles of the synthetic water on the surface coated with chemical compositions from Table I are presented in Table 3.

TABLE 3

Average Contact Angle of Synthetic Water on Coated Model Surface

| | | METHOD B | | |
|---|---|---|---|---|
| REFERENCE | METHOD A | 0.1 sec | 1.0 sec | 10 sec |
| Blank | 62 | 59 | 58 | 54 |
| PB-1 | 58 | 77 | 70 | 62 |
| PB-2 | 68 | 79 | 70 | 60 |
| PB-3 | 70 | 83 | 72 | 63 |
| PB-4 | 67 | 70 | 70 | 64 |
| PB-5 | 66 | 74 | 68 | 60 |
| PB-6 | | 83 | 74 | 62 |
| PB-7 | | 76 | 70 | 62 |

TABLE 3-continued

Average Contact Angle of Synthetic Water on Coated Model Surface

| | | METHOD B | | |
|---|---|---|---|---|
| REFERENCE | METHOD A | 0.1 sec | 1.0 sec | 10 sec |
| PB-8 | | 78 | 71 | 63 |
| PB-9 | | 84 | 75 | 67 |
| PB-10 | | 78 | 70 | 62 |
| PB-11 | 62 | 74 | 68 | 59 |
| PB-12 | 65 | 84 | 74 | 65 |
| PB-13 | | 84 | 76 | 62 |

All polybutene blends increased the hydrophobicity of the model surface even in the presence of the surfactants in the synthetic sheet water.

Example 3

Polybutene formulations were evaluated on two different samples of ceramic press roll covering used in the paper industry. An atomized spray of the formulations was used to apply a thin coating to the ceramic surfaces. In a rapidly moving paper machine, the contact angle at 0.1 seconds is of most significance. The average contact angle of deionized and synthetic water at 0.1 second is shown in Table 4.

TABLE 4

Average Contact Angle on Ceramic Roll Covering Material
(Water drop contact time 0.1 second)

| | CERAMIC SAMPLE 1 | | CERAMIC SAMPLE 2 | |
|---|---|---|---|---|
| REFERENCE | Deionized Water | Synthetic Water | Deionized Water | Synthetic Water |
| Blank | 66 | 59 | 79 | 69 |
| PB-6 | 90 | 86 | 99 | 98 |
| PB-7 | 83 | 74 | 91 | 85 |
| PB-13 | 88 | 87 | 94 | 97 |

The polybutene blends were particularly effective on the ceramic press roll surfaces.

Example 4

A Wet Web Release Tester was used to measure the release force necessary to separate a pressed wet paper web from a treated ceramic surface. Paper sheets of 105 g/m$^2$ basis weight were made using a standard laboratory handsheet former. Two different fiber furnishes were used to make the paper webs. Furnish 1 was a 70/30 blend of birch and pine diluted with tap water. Furnish 2 contained the same fiber blend, with a surfactant based product commonly used for contaminant control added to drop the surface tension and increase wetting. A flat sample of ceramic press roll covering material typical of what is used in the paper industry was coated either by lightly spraying an atomized solution on the dry roll cover or by soaking the roll cover in a solution of treatment. The wet webs were pressed to the treated roll cover material and the adhesion force was measured. The results are shown in Table 5. The blanks represent web release from a roll surface soaked in water or from a dry roll surface lightly sprayed with a mist of water.

TABLE 5

Wet Web Release from Ceramic Press Roll Cover Material

| | FURNISH 1 | | | | FURNISH 2 | |
|---|---|---|---|---|---|---|
| | Web Pressed Once | | Web Pressed Twice | | Web Pressed Once | |
| REFERENCE | Release Force N/m | Web Solids % | Release Force N/m | Web Solids % | Release Force N/m | Web Solids % |
| Blank - soak | 2.4 | 36 | 2.6 | 46 | 1.0 | 41 |
| Blank - spray | 1.3 | 36 | 1.8 | 46 | 1.1 | 43 |
| L-6, 1 ppm - soak | 1.9 | 37 | 2.6 | 46 | 0.9 | 41 |
| L-6, 10 ppm - soak | 2.1 | 37 | 2.5 | 46 | | |
| L-6, 100 ppm - soak | 1.9 | 38 | 2.4 | 47 | 0.8 | 42 |
| L-6, undiluted - spray | 1.6 | 41 | 1.6 | 49 | 1.3 | 44 |
| L-7, 10 ppm - soak | 2.1 | 36 | 2.2 | 46 | 0.9 | 41 |
| L-7, 100 ppm - soak | 2.1 | 37 | 2.2 | 47 | | |
| L-7, 1000 ppm - soak | 1.3 | 37 | 2.0 | 47 | 1.0 | 42 |
| L-7, undiluted - spray | 2.0 | 35 | 2.5 | 47 | 1.4 | 42 |
| PB-6, undiluted - spray | 0.5 | 42 | 0.4 | 50 | 0.4 | 46 |

The polybutene blend outperformed the microemulsions. Note also that the spray addition of the concentrated microemulsion (L-6) and the polybutene blend (PB-6) produced higher web solids. This demonstrates an additional advantage of reducing the water carried with the roll surface by replacing the water shower with polybutene.

Example 5

A short experiment was conducted on the center press roll of a paper machine that commonly experiences a high degree of press roll picking. A water shower just prior to the first doctor blade was turned off for the experiments. Product L-7 and PB-6 were compared by spraying them, undiluted, on the roll surface prior to the doctor blade to observe the effect on picking and on the release point from the roll. Picking was greater during application of product L-7 then during that of PB-6. The point of release remained unchanged for L-7 but trended downward (improved release) during the PB-6 experiment.

What is claimed is:

1. A method of reducing adhesion to a surface of equipment used in paper manufacture or in paper converting processes, said method characterized in applying to such surface a non-aqueous composition comprising one or more non-curing hydrocarbon polymers having the formula $$(CH_3)_3C-[-C(R_1)(R_2)-C(R_3)(R_4)-]_n-C(R_5)=C(CH_3)_2 \quad (I)$$

or hydrogenates thereof, wherein $R_1$ through $R_5$ are hydrogen or —$CH_3$, with at least one of $R_1$ through $R_4$ being —$CH_3$, and n is such that the number average molecular weight of such hydrocarbon polymers is from 50 to 3000.

2. The method according to claim 1 wherein the one or more non-curing hydrocarbon polymers have the formulas $$(CH_3)_3C-[-CH_2-C(CH_3)_2-]_n-CH=C(CH_3)_2 \quad (II)$$

or $$(CH_3)_3C-[-CH(CH_3)-CH(CH_3)-]_n-CH=C(CH_3)_2 \quad (III)$$

or hydrogenates thereof.

3. The method according to claim 1 wherein the non-curing hydrocarbon polymers have a number average molecular weight from 100 to 1000.

4. The method according to claim 1 wherein the non-curing hydrocarbon polymers comprise at least one component having a number average molecular weight from 400 to 700.

5. The method according to claim 4 wherein the non-curing hydrocarbon polymers comprise at least one second such component having a number average molecular weight from 100 to 400.

6. The method according to claim 1 wherein the non-aqueous composition further includes one or more non-aqueous solvents.

7. The method according to claim 6 wherein the non-aqueous solvents are selected from mineral oil, white oil and petroleum distillate.

8. The method according to claim 1 wherein the non-aqueous composition further includes one or more hydrophobic additives.

9. The method according to claim 8 wherein the hydrophobic additives are selected from paraffin wax, microcrystalline wax, petrolatum gel and fatty amide wax.

10. The method according to claim 1 wherein the non-aqueous composition is applied to the surface of press rolls.

11. The method according to claim 1 wherein the non-aqueous composition is applied to the surface of press rolls, lump-breaker rolls, couch rolls, uhle box covers, dryer cans, calender rolls, corrugating fluting rolls, or papermaking fabrics.

12. The method according to claim 1 wherein the amount applied and manner of application are sufficient to maintain a uniform coating of the non-aqueous composition on the equipment surface during operation.

13. A method of reducing adhesion to a surface of equipment used in paper manufacture or in paper converting processes, said method characterized in applying to the equipment surface a non-aqueous composition comprising one or more non-curing polybutenes having the formulas $$(CH_3)_3C-[-CH_2-C(CH_3)_2-]_n-CH=C(CH_3)_2 \quad (II)$$

$$(CH_3)_3C-[-CH(CH_3)-CH(CH_3)-]_n-CH=C(CH_3)_2 \quad (III)$$

or hydrogenates thereof, wherein n is such that the number average molecular weight of such non-curing polybutenes is from 50 to 3000.

14. The method according to claim 13 the number average molecular weight of such non-curing polybutenes is from 100 to 1000.

15. The method according to claim 13 wherein the non-curing polybutenes have the formula $$(CH_3)_3C-[-CH_2-C(CH_3)_2-]_n-CH=C(CH_3)_2 \quad (II)$$

or hydrogenates thereof.

16. The method according to claim 13 wherein the non-aqueous composition comprises a) from 20 to 100 percent by weight of hydrogenated or non-hydrogenated, non-curing polybutenes of the formula $$(CH_3)_3C-[-CH_2-C(CH_3)_2-]_n-CH=C(CH_3)_2 \quad (II)$$

with a number average molecular weight from 400 to 700; and
(b) from 0 to 80 percent by weight of one or more components selected from
  (i) a non-curing polybutene of the formula (II) with a number average molecular weight from 100 to 400,
  (ii) one or more non-aqueous solvents; and
  (iii) one or more hydrophobic additives.

17. The method according to claim 16 wherein the non-aqueous solvents are selected from mineral oil, white oil and petroleum distillate.

18. The method according to claim 16 wherein the hydrophobic additives are selected from paraffin wax, microcrystalline wax, petrolatum gel and fatty amide wax.

19. The method according to claim 13 wherein one or more (b) components are present in the composition.

20. The method according to claim 19 wherein the non-curing polybutenes have at least one second such component having a number average molecular weight from 100 to 400.

21. The method according to claim 13 wherein the non-aqueous composition is applied to the surface of press rolls.

22. The method according to claim 13 wherein the non-aqueous composition is applied to the surface of press rolls, lump-breaker rolls, couch rolls, uhle box covers, dryer cans, calender rolls, corrugating fluting rolls, or papermaking fabrics.

23. The method according to claim 13 wherein the amount applied and manner of application are sufficient to maintain a uniform coating of the non-aqueous composition on the equipment surface during operation.

24. A method of reducing adhesion to a surface of equipment used in paper manufacture or in paper converting processes, said method characterized in applying a non-curing polybutene composition to such surface, wherein the non-curing polybutene composition comprises
(a) from 20 to 100 percent by weight of hydrogenated or non-hydrogenated, non-curing polybutenes of the formula

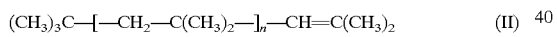  (II)

with a number average molecular weight from 400 to 700; and
(b) from 0 to 80 percent by weight of one or more components selected from
  (i) non-curing polybutenes of the formula (II) with a number average molecular weight from 100 to 400,
  (ii) one or more non-aqueous solvents; and
  (iii) one or more hydrophobic additives.

25. The method according to claim 24 wherein one or more (b) components are present in the composition.

26. A method according to claim 24 wherein the non-curing polybutene with a number average molecular weight from 400 to 700 comprises 50 to 90 percent by weight of the composition.

27. A method according to claim 26 wherein the non-curing polybutenes with a number average molecular weight from 100 to 400 comprise 10 to 50 percent by weight of the composition.

28. A method according to claim 26 wherein the one or more non-aqueous solvents comprise 10 to 50 percent by weight of the composition.

29. A method according to claim 26 wherein the hydrophobic additives comprise 1 to 25 percent by weight of the composition.

30. A method according to claim 26 wherein the hydrophobic additives are selected from paraffin wax, microcrystalline wax, and fatty amide wax and comprise 1 to 10 percent by weight of the composition.

31. A method according to claim 24 wherein the non-aqueous solvents are selected from mineral oil, white oil and petroleum distillate.

32. A method according to claim 24 wherein the hydrophobic additives are selected from paraffin wax, microcrystalline wax, petrolatum gel and fatty amide wax.

33. The method according to claim 24 wherein the non-aqueous composition is applied to the surface of press rolls.

34. The method according to claim 24 wherein the non-curing polybutene composition is applied to the surface of press rolls, lump-breaker rolls, couch rolls, uhle box covers, dryer cans, calender rolls, corrugating fluting rolls, or papermaking fabrics.

35. The method according to claim 24 wherein the amount applied and manner of application are sufficient to maintain a uniform coating of the non-aqueous composition on the equipment surface during operation.

* * * * *